Nov. 28, 1950     C. P. PINARDI ET AL     2,532,189
ACCELERATOR PEDAL

Filed Oct. 25, 1946     3 Sheets-Sheet 1

C. P. PINARDI
D. L. POOLE
INVENTORS

ATTORNEYS.

C. P. PINARDI
D. L. POOLE
INVENTORS

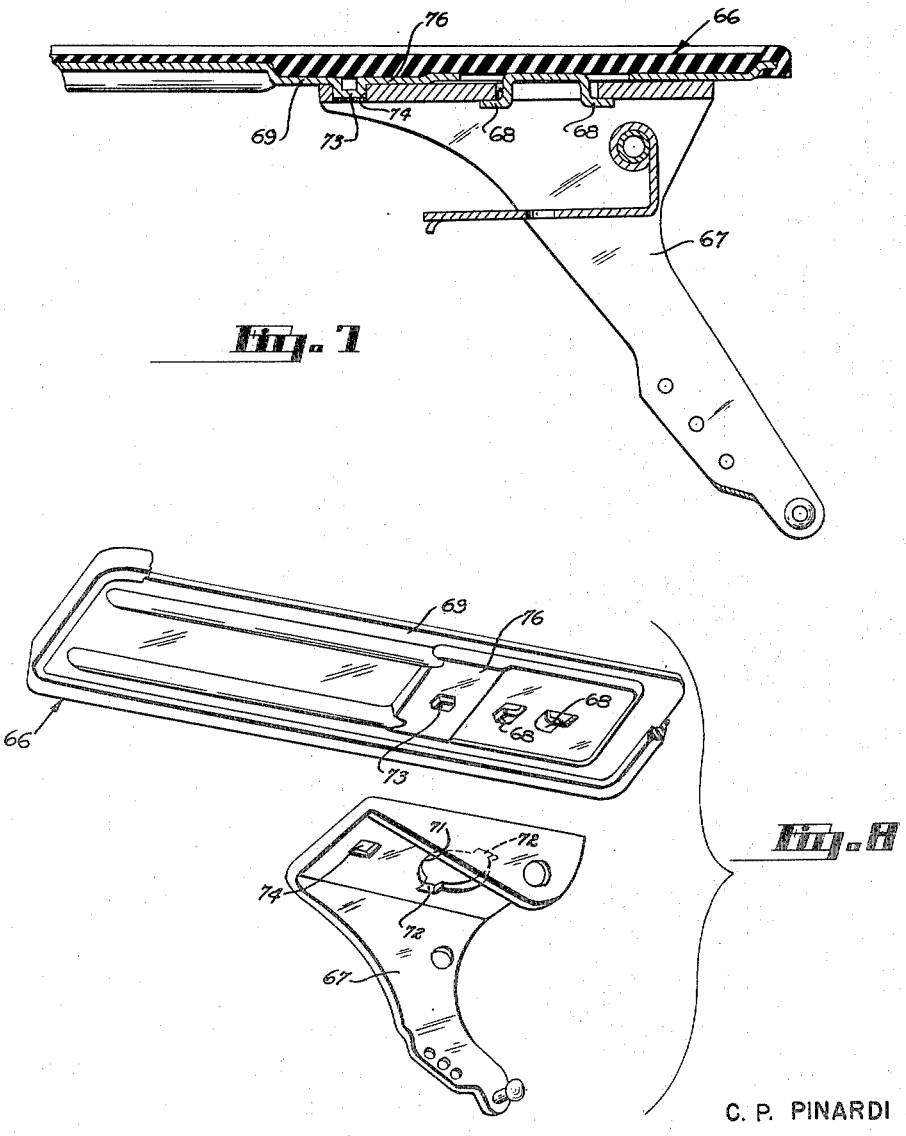

Patented Nov. 28, 1950

2,532,189

UNITED STATES PATENT OFFICE 2,532,189

ACCELERATOR PEDAL

Charles P. Pinardi, Dearborn, and Douglas L. Poole, Detroit, Mich., assignors to Ford Motor Company, Dearborn, Mich., a corporation of Delaware Application October 25, 1946, Serial No. 705,714

3 Claims. (Cl. 74—513)

1

This invention relates generally to pedals and has particular reference to the construction of accelerator pedals for use in motor vehicles.

An object of the invention is to provide an accelerator pedal construction in which the pedal pad is detachably mounted upon the structure in such manner as to be easily attached or detached. This is accomplished without sacrificing rigidity and stability in the assembly, and the pad is mounted in such manner that accidental displacement is impossible.

Another object of the invention is to provide an accelerator pedal construction in which the cost of manufacture is materially reduced without sacrificing quality. This economy is effected by so designing the structure as to simplify the fabrication and assembly of the parts. Furthermore, all welding and brazing operations are eliminated.

Another feature of the invention resides in the fact that the metal plate of the pedal pad is rubber covered on both sides and carries with it a spring clip embedded in the rubber and adapted to be readily attached to an actuating lever which is pivotally supported upon a bracket mounted upon the vehicle toeboard.

Other objects and advantages of the invention will be made more apparent as this description proceeds, particularly when considered in connection with the accompanying drawings, wherein:

Figure 7 is a cross sectional view similar to Figure 4 but illustrating a modification.

Figure 8 is an exploded perspective view of parts of the modified structure shown in Figure 7.

Figure 1:
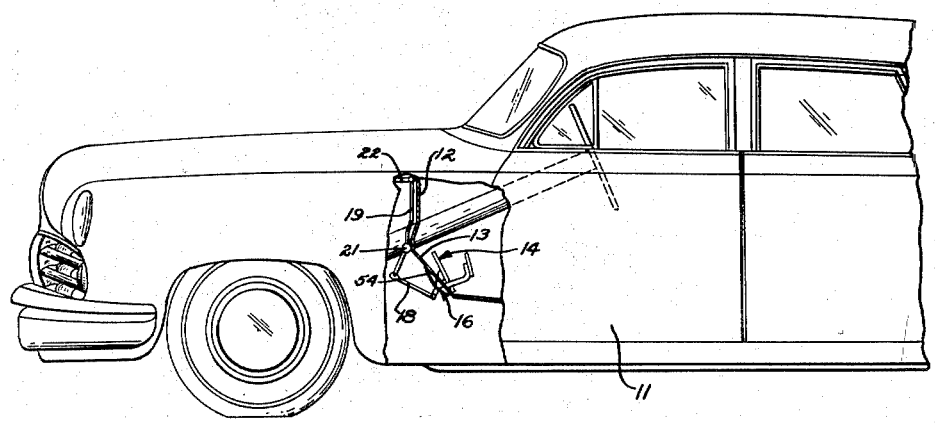
Figure 1 is a side elevation of a portion of a motor vehicle, partly broken away to illustrate the accelerator pedal assembly.

Referring now more particularly to the drawings, there is shown in Figure 1 a portion of a motor vehicle having a body 11 broken away to show a portion of the cowl 12 and the toeboard 13. An accelerator pedal assembly is mounted upon the toeboard 13 for operation by the driver of the vehicle, and includes an accelerator pedal pad 14 detachably mounted upon an actuating lever 16 which in turn is pivotally supported upon a bracket 17 fixedly secured to the toeboard 13. The lower end of the actuating lever 16 is connected by a tie rod 18 to the lower extremity of a lever 19 fulcrumed upon the cowl 12 at 21. The upper end of the lever 19 is suitably connected by another tie rod 22 to the throttle of the carburetor (not shown) of the engine.

Attention is now directed to Figures 2 to 6 inclusive for a more detailed understanding of the construction of the accelerator pedal assembly. The accelerator pedal pad 14 comprises a sheet metal plate 23 formed at one end with a pair of spaced rectangular openings 24 and 26, and with a series of spaced apertures 27.

It will be noted that the rectangular opening 24 is considerably wider than the opening 26, and that the two openings are adapted to receive the opposite legs 28 and 29 respectively of a spring clip 31. A retaining flange 32 is formed at the end of the wide leg 28, and the short leg 29 is similarly formed with a short retaining flange 33 which continues into an operating tab 34. The spring clip is formed of spring steel and the legs 28 and 29 may be sprung apart to enable the latter to be inserted through the openings in the plate. In addition, it will be noted that a pair of apertures 36 are formed in the spring clip 31 in alignment with the apertures 27 formed in the plate.

The sub-assembly thus formed, consisting of the plate 23 and the spring clip 31, is next enclosed within a rubber pad 37 which is preferably suitably molded or vulcanized thereto. During the molding operation, the rubber flows through the apertures 27 and 36 in the plate and clip respectively, and through the rectangular openings 24 and 26 in the plate, thus forming a unitary assembly. The upper surface of the rubber pad 37 is provided with a plurality of longitudinally extending grooves 38 to resist side slippage of the operator's foot upon the pedal. A thin layer of rubber is also provided upon the underneath side of the plate 23, but is of insufficient thickness to cover the longitudinally extending ribs 39 which are formed upon the bottom of the plate for a purpose which will appear later in this description. It will be apparent that the accelerator pedal pad construction thus formed comprises an easily fabricated assembly in which the spring clip is carried by the plate without the necessity of being riveted or welded thereto.

The remainder of the accelerator pedal assembly includes the bracket 17 upon which the actuating lever 16 is pivotally mounted by means of a bushing 41. The bracket 17 has a base flange 42 provided with locating tabs 43 and a bolt hole 44 through which a bolt is inserted to rigidly mount the bracket upon the toeboard of the vehicle. A flange 46 projects upwardly from the rearward end of the base flange 42 and is formed with a rolled upper end 47 housing the bushing 41, the ends of which project into holes 48 provided in alignment with each other in the side flanges 49 and 51 of the actuating lever 16.

Figure 2:
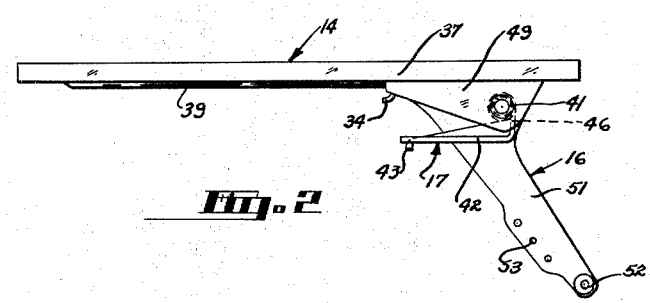
Figure 2 is a side elevation of the accelerator pedal assembly detached from the vehicle.
Figure 3:
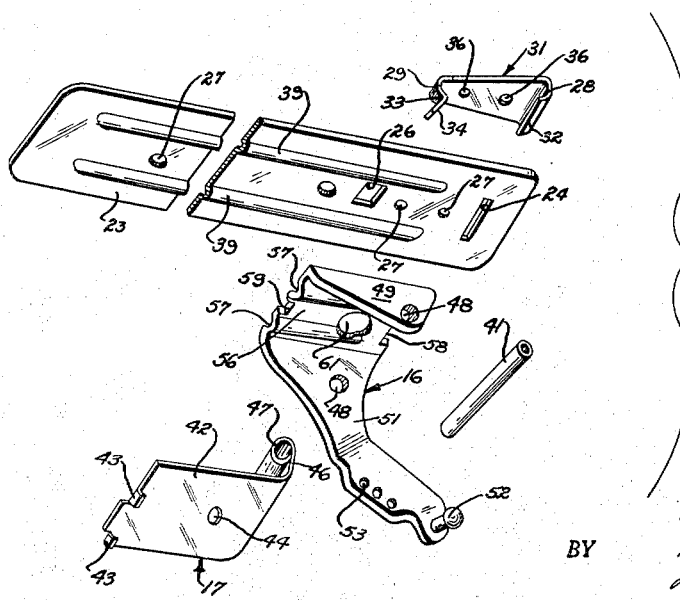
Figure 3 is an exploded perspective view of parts of the accelerator pedal assembly.
Figure 4:
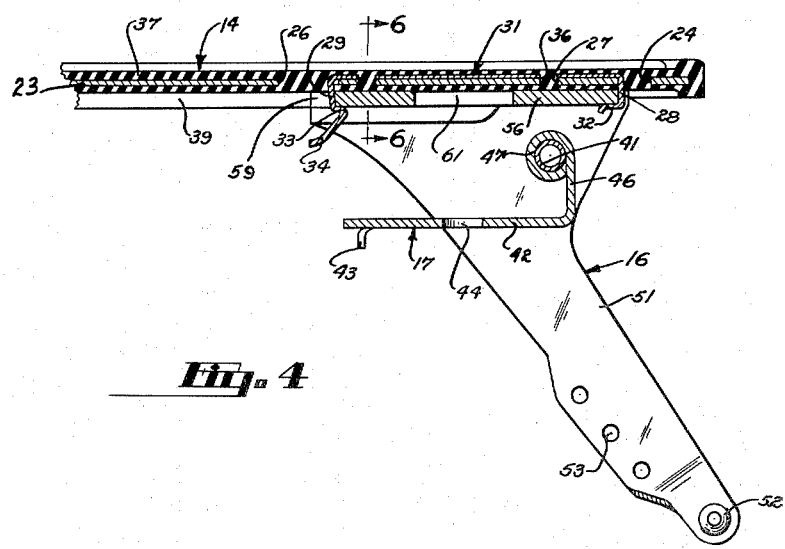
Figure 4 is an enlarged fragmentary longitudinal cross sectional view through the pedal assembly, taken substantially on the plane indicated by the line 4—4 of Figure 5.
Figure 5:
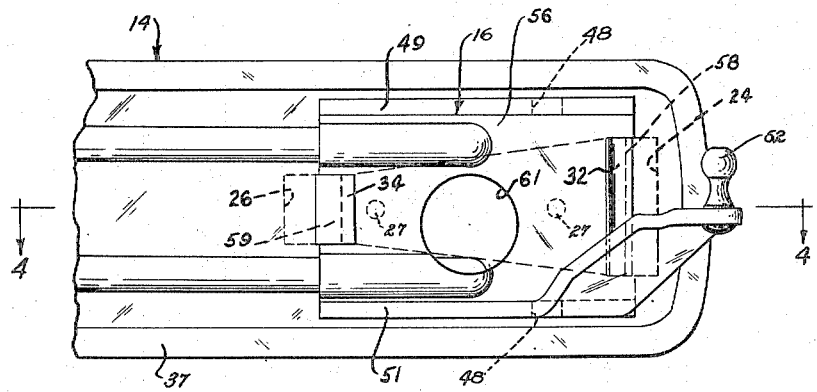
Figure 5 is a bottom plan view of the construction shown in Figure 4 with the supporting bracket omitted.

As best seen in Figures 2 and 3, the side flange 49 of the actuating lever is relatively short while the opposite side flange 51 extends downwardly a considerable distance and supports at its lower end a ball type pivot pin 52 which is adapted to be connected to the tie rod 18 previously mentioned. A series of spaced holes 53 are formed in the side flange 51 of the lever to receive one end of a return 54, the opposite end of which is connected to the toeboard 13. The spring functions to bias the pedal pad to an upward or inoperative position, and the plurality of holes 53 provides for adjusting the tension of the spring.

Figure 6:
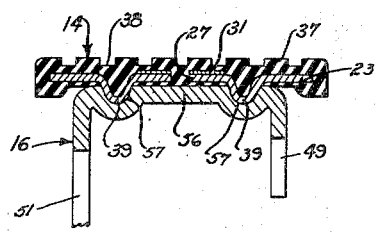
Figure 6 is a transverse cross sectional view through the assembly taken substantially on the plane indicated by the line 6—6 of Figure 4.

The upper leg 56 of the actuating lever is adapted to seat against the lower surface of the pedal pad assembly 14, and is provided with a pair of laterally spaced longitudinally extending grooves 57 which engage the ribs 39 formed upon the plate 23, as best seen in Figure 6. Engagement between the ribs and grooves prevents lateral displacement of the pedal pad relative to the actuating lever and in addition strengthens the parts. Relative longitudinal displacement between the pad and lever is prevented by engagement of the legs 28 and 29 of the spring clip 31 in notches 58 and 59 respectively formed in opposite ends of the upper leg 56 of the actuating lever. In addition, after the assembly between the actuating lever and the pedal pad assembly is completed, accidental disengagement is prevented by the engagement of the retaining flanges 32 and 33 of the spring clip with the lower surface of the upper leg 56 of the actuating lever.

A large access hole 61 is formed in the upper leg 56 of the actuating lever and permits a wrench or other suitable tool to be inserted therethrough to tighten the bolt fastening the bracket 17 to the toeboard.

It will now be apparent that the assembly of the pedal pad to the actuating lever is easily effected by first inserting the rearward end of the upper leg of the lever into the rearward end of the spring clip so that the leg 28 of the clip is seated in the notch 58 of the lever, and then forcing the forward end of the upper leg of the lever past the operating tab 34 of the spring clip. The resiliency of the leg 29 of the clip enables it to be readily bent to permit this assembly and to then return into clamping and locking engagement with the lever. In the assembled position, the upper surface of the upper leg of the actuating lever seats against the rubber covered lower surface of the pedal pad and is tightly held thereagainst by the spring clip, thus forming a rigid assembly held against relative displacement in all directions and insulated against noise by the intervening layer of rubber. To disassemble the pedal pad from the actuating lever, for repair or replacement purposes, it is only necessary to grasp the operating tab 34 of the spring clip and spring the latter outwardly, after which the pedal pad can be easily disassembled from the lever.

Thus, not only is a rigid and quiet assembly provided, but the cost of manufacture is held to a minimum since the fabrication of the various parts is relatively simple and the assembly one which can be made without special equipment and without welding, brazing or riveting operations.

In the modification shown in Figures 7 and 8, the overall construction of the accelerator pedal is generally the same as that shown in Figures 1 to 6 inclusive, but the mode of attachment of the pedal pad assembly 66 to the actuating lever 67 is somewhat different. A pair of lugs 68 are stamped from the plate 69 of the pedal pad assembly and project downwardly. The upper leg of the actuating lever 67 is provided with an opening 71 which is formed at opposite sides with elongated grooves 72. To assemble the pedal, the pedal pad assembly 66 is turned at right angles to the actuating lever 67 to permit the lugs 68 to be inserted through the elongated grooves 72 formed in the upper leg of the lever, and the pedal pad is then turned 90 degrees to its final position, in which position the lugs 68 extend over the edges of the opening 71 and engage the lower surface of the upper leg of the actuating lever.

A rectangular projection 73 is struck outwardly from the lower side of the plate 69 of the pedal pad assembly and is adapted in the assembled position of the accelerator pedal to seat in a correspondingly shaped opening 74 formed in the upper leg of the actuating lever 67. This serves as a locking device preventing accidental rotation of the accelerator pedal relative to the actuating lever. It will be noted that the plate 69 is raised slightly at 76 adjacent the projection 73, serving to lift the upper leg of the lever 67 into tight engagement with the lugs 68 to prevent rattling, etc. One advantage of the construction shown by this modification is that a separate spring clip is not necessary. The spring clip shown in Figures 1 to 6 inclusive, however, possesses the advantage of simplicity of assembly and disassembly of the pedal pad from the actuating lever.

It will be understood that the invention is not to be limited to the exact construction shown and described, but that various changes and modifications may be made without departing from the spirit and scope of the invention, as defined in the appended claims.

What is claimed is:

1. An accelerator pedal for a motor vehicle comprising, in combination, a support, an actuating lever pivotally mounted on said support, said actuating lever having an upper leg formed with notches on the opposite sides thereof, a return spring biasing said lever toward its nonoperating position, a rubber covered pedal plate positioned above and adjacent said actuating lever, said pedal plate having a pair of spaced openings formed therein, and a spring clip carried by said pedal plate and adapted to detachably connect said plate to said lever, said spring clip having end flanges projecting through the spaced openings in said pedal plate, the legs of said spring clip being yieldably engageable in the notches formed on opposite sides of the upper leg of said actuating lever to detachably connect said plate to said lever.

2. An accelerator pedal of the type mounted adjacent the toeboard of a motor vehicle for controlling the carburetor, said toeboard being provided with an opening therethrough, comprising, in combination, a supporting bracket having one flange fixedly mounted upon said toeboard and another flange extending upwardly therefrom, an actuating lever pivotally connected to said supporting bracket and having a portion extending through the opening in said toeboard for connection with said carburetor to control the latter and a portion extending upwardly from said toeboard and having a laterally extending flange, said laterally extending flange having a pair of laterally spaced longitudinally extending locating grooves formed therein, a pedal plate having a pair of laterally spaced longitudinally extending ribs formed therein for co-operation with the grooves in said flange to prevent inadvertent lateral displacement therebetween, and means for detachably connecting said pedal plate to said flange.

3. An accelerator pedal of the type mounted adjacent the toeboard of a motor vehicle for controlling the carburetor, said toeboard being provided with an opening therethrough, comprising, in combination a supporting bracket mounted upon said toeboard, an actuating lever pivotally connected to said supporting bracket and having a portion extending downwardly through the opening in said toeboard for connection to said carburetor to control the latter and a portion extending upwardly from said toeboard and having a laterally extending flange, a metal pedal plate supported upon said flange and having a pair of longitudinally spaced openings therein, a generally U-shaped spring clip having an upper leg seated upon the upper surface of said pedal plate and a pair of downwardly depending end flanges extending through the spaced openings in said pedal plate, said flanges being resilient and yieldably engageable with spaced portions of the above-mentioned laterally extending flange of said actuating lever to detachably secure said pedal plate to said lever, said pedal plate and said U-shaped spring clip being completely embedded in a rubber covering with the exception of the resilient end flanges of the clip which project downwardly through said rubber covering.

CHARLES P. PINARDI.
DOUGLAS L. POOLE.

REFERENCES CITED

The following references are of record in the file of this patent:

UNITED STATES PATENTS

| Number | Name | Date |
|---|---|---|
| 1,473,156 | Mickelsen | Nov. 6, 1923 |
| 1,880,583 | Thorp | Oct. 4, 1932 |